(12) United States Patent
Jones

(10) Patent No.: US 6,435,452 B1
(45) Date of Patent: Aug. 20, 2002

(54) AIRCRAFT DRAINMAST ASSEMBLY

(75) Inventor: Darryl Warren Jones, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 09/932,868

(22) Filed: Aug. 17, 2001

Related U.S. Application Data

(60) Provisional application No. 60/226,166, filed on Aug. 18, 2000.

(51) Int. Cl.⁷ .............................................. G64D 45/02
(52) U.S. Cl. .................................. 244/1 A; 244/129.1
(58) Field of Search ............................ 244/129.1, 1 A, 244/121, 136; 239/14.1, 128

(56) References Cited

U.S. PATENT DOCUMENTS

| | | |
|---|---|---|
| 3,906,308 A | 9/1975 | Amason et al. |
| 3,989,984 A | 11/1976 | Amason et al. |
| 4,202,061 A | 5/1980 | Waters |
| 4,437,487 A * | 3/1984 | Marmon ...................... 137/322 |
| 4,715,561 A * | 12/1987 | Spinosa et al. ............. 137/430 |
| 4,755,904 A | 7/1988 | Brick |
| 4,905,931 A | 3/1990 | Covey |
| 5,290,996 A * | 3/1994 | Giamati et al. ............. 219/201 |
| 5,542,624 A * | 8/1996 | Smith .......................... 244/1 A |
| 5,552,576 A * | 9/1996 | Giamati ...................... 219/201 |
| 5,655,732 A * | 8/1997 | Frank .......................... 239/171 |
| 5,841,066 A | 11/1998 | Bocherens |
| 6,006,373 A | 12/1999 | Hoáng |
| 6,211,494 B1 * | 4/2001 | Giamati et al. ............. 219/201 |

\* cited by examiner

*Primary Examiner*—Charles T. Jordan
*Assistant Examiner*—Gabriel S Sukman
(74) *Attorney, Agent, or Firm*—Renner, Otto, Boisselle & Sklar, LLP

(57) ABSTRACT

An aircraft drainmast assembly including a drainmast for ejection of waste water from an aircraft and a grounding plate for protection against lightning strike currents. The grounding plate is made of an electrically conductive material and is attached to the metallic drain tube in such manner (e.g., welding) that a conductive path is established between the grounding plate and the drain tube. The grounding plate is placed in contact with the aircraft fuselage during installation of the drainmast whereby an electrically conductive path is formed thereby allowing lightning strike currents to travel from the drain tube to the grounding plate to the aircraft fuselage. The grounding plate may be pressed against the outside surface of the fuselage by an elastomeric gasket installed between the grounding plate and a flange of the drainmast's fairing thereby allowing for a simple lightning protection installation from the outside of the aircraft.

17 Claims, 2 Drawing Sheets

AIRCRAFT DRAINMAST ASSEMBLY

RELATED APPLICATIONS

This application claims priority under 35 U.S.C. §119 (e) to U.S. Provisional Application No. 60/226,166 filed on Aug. 18, 2000. The entire disclosure of this earlier application is hereby incorporated by reference.

FIELD OF THE INVENTION

This invention relates generally as indicated to an aircraft drainmast assembly and, more particularly, to a drainmast assembly including a lightning protection grounding plate which may be installed from outside the aircraft.

BACKGROUND OF THE INVENTION

A drainmast is used to eject waste water from an aircraft during flight and/or when the aircraft is on the ground. Waste water may be generated from many sources, such as the aircraft galley wherein water, soft drinks, coffee, wine, orange juice and other potable liquids are collected. Waste water can also accumulate from engine and other air inlets that trap water from condensation or ingest rain. In any event, the drainmast assembly communicates with the outlet of the aircraft's waste water system.

A drainmast typically comprises a fairing, a drain tube, and some type of heater. With particular reference to a rear discharge drainmast, the fairing will commonly include a mounting flange, a mast, and an exit cap. The mast extends from the flange to the exit cap and is shaped to be aerodynamically advantageous. The drain tube is usually made of a metallic material and is positioned within the fairing cavity. The inlet of the drain tube is coupled to an adapter which is connected to the outlet of the aircraft waste water system. The outlet of the drain tube is positioned at the exit of the fairing cap. The heater is provided to prevent freezing of the waste water as it passes through the drain tube.

Lightning strikes involving aircraft are a common occurrence. If a lightning strike was to occur near a drainmast, it is expected to attach to the distal end of the fairing exit cap. The high currents created by the strike are expected to travel up the metallic drain tube in search for ground. If the current is not quickly transferred to an electrical ground, it could continue to travel along the adjacent drain tube and penetrate further into the aircraft.

Grounding may be accomplished by using a jumper wire, supplied with a ring terminal, that is suitable for attachment to the airframe which typically represents electrical ground for the aircraft. When using a jumper wire, care must be taken to ensure the wire is of sufficient length to allow easy installation, but short enough so as to not create any sharp bends after installation. Any bends in the wire become likely break points if the wire has to carry major portions of the lightning current. Induced voltage on long jumper wires may also prove to be sufficient to spark over a direct, shorter path across an air gap in search of ground. Furthermore, there must be a suitable airframe attachment point for the ring terminal used on the jumper wire. This attachment point must be cleaned and alodined prior to installation of the ring terminal, to ensure good metal-to-metal contact, without metal corrosion. This can present a problem to aircraft maintenance workers, as it is not always easy to find, clean and alodine a suitable grounding point.

SUMMARY OF THE INVENTION

The present invention provides a drainmast assembly incorporating a grounding plate for lightning protection purposes. The design of the drainmast assembly is such that the grounding plate may be installed from outside the aircraft and, in any event, eliminates the need for a maintenance worker to clean and alodine an attachment point within the aircraft.

More particularly, the present invention provides a drainmast assembly comprising a drainmast for ejection of waste water from an aircraft and a grounding plate for protection against lightning strike currents. The fairing is made of an electrically non-conductive material and includes a mounting flange, an exit cap, and an aerodynamically advantageously shaped mast extending from the mounting flange to the exit cap. The drain tube is made of an electrically conductive material (e.g., metal), is positioned at least partially within the fairing, and includes an inlet which communicates with an aircraft waste water system and an outlet positioned within the fairing's exit cap.

The grounding plate is made of an electrically conductive material and is attached to the drain tube in such manner (e.g., welding) that an electrically conductive path is established between the grounding plate and the drain tube. The grounding plate is placed in contact with the aircraft fuselage during installation of the drainmast. As a result, lightning strike currents will travel from the drain tube to the grounding plate to the aircraft fuselage. The grounding plate will have a higher current carrying capacity than, for example, a jumper wire, due to it's substantially larger cross-sectional area.

The grounding plate may be pressed against the outside surface of the fuselage by an elastomeric gasket installed between the composite fairing and grounding plate. When the drainmast assembly is installed, sufficient pressure is developed between the fairing mounting flange and fuselage attachment points to ensure good metal-to-metal contact between the grounding plate and fuselage. This allows for a simple lightning protection installation from the outside of the aircraft. It is not necessary to remove paint or apply any protective coatings to the surface of the fuselage, as any paint in the bonding region will most likely be burned away if a strike were to occur.

To prevent the lightning current from traveling further into the aircraft, an adapter made from electrically non-conductive material may be used to couple the inlet of the drain tube to the outlet of the air waste water system. In this manner, the lightning current will be prevented from sparking from the drain tube to the aircraft waste water system outlet pipe.

These and other features of the invention are fully described and particularly pointed out in the claims. The following descriptive annexed drawings set forth in detail certain illustrative embodiments of the invention, these embodiments being indicative of but a few of the various ways in which the principles of the invention may be employed.

DRAWINGS

DETAILED DESCRIPTION

Figure 1:
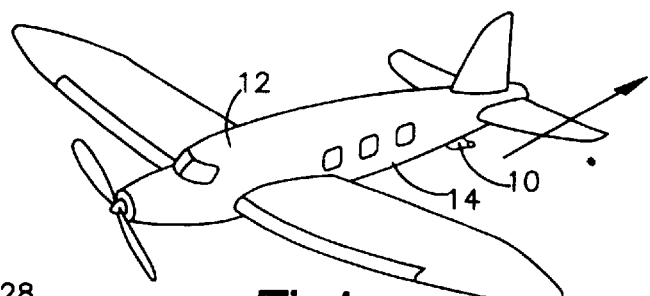
FIG. 1 is a schematic view of a drainmast assembly according to the present invention installed on an aircraft.

Referring now to the drawings in detail, and initially to FIG. 1, a drainmast assembly 10 according to the present invention is shown installed on an aircraft 12. The drainmast assembly 10 is attached to a bottom mounting surface 14 of the aircraft's fuselage and communicates with the outlet 16 of the aircraft waste water system to eject waste water when the aircraft 12 is in flight. As is explained in more detail below, the drainmast assembly 10 allows a simple lightning protection installation from outside the aircraft 14.

Figure 2:
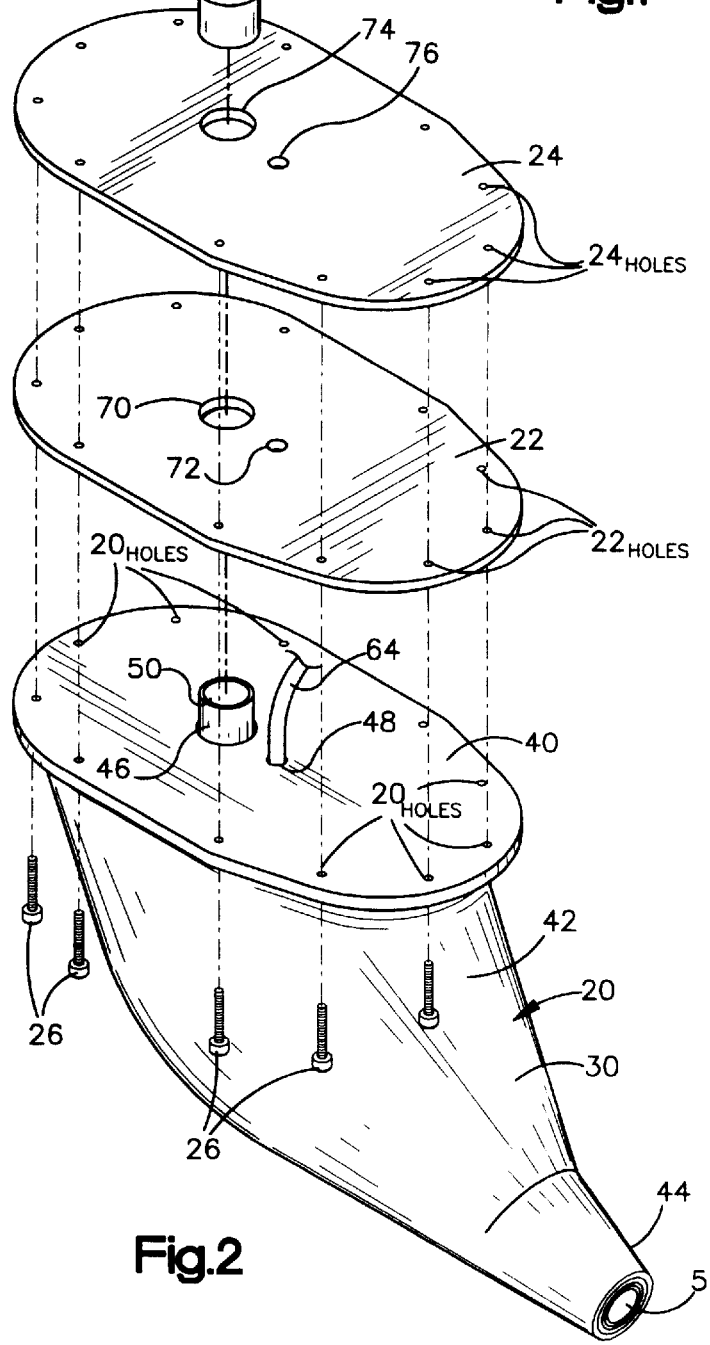
FIG. 2 is an exploded view of the drainmast assembly and the mounting surface of the aircraft.

Referring additionally to FIG. 2, the drainmast assembly 10 includes a drainmast 20, a mounting gasket 22 and a grounding plate 24. The drainmast 20, the mounting gasket 22 and the grounding plate 24, are attached to the aircraft mounting surface 14 by fasteners 26 which extend through aligned openings $20_{holes}$, $22_{holes}$, and $24_{holes}$ in the drainmast, gasket and plate, respectively. An adapter 28 couples the drainmast assembly 10 to the outlet 16 (FIG. 3) of the aircraft waste water system.

Figure 3:
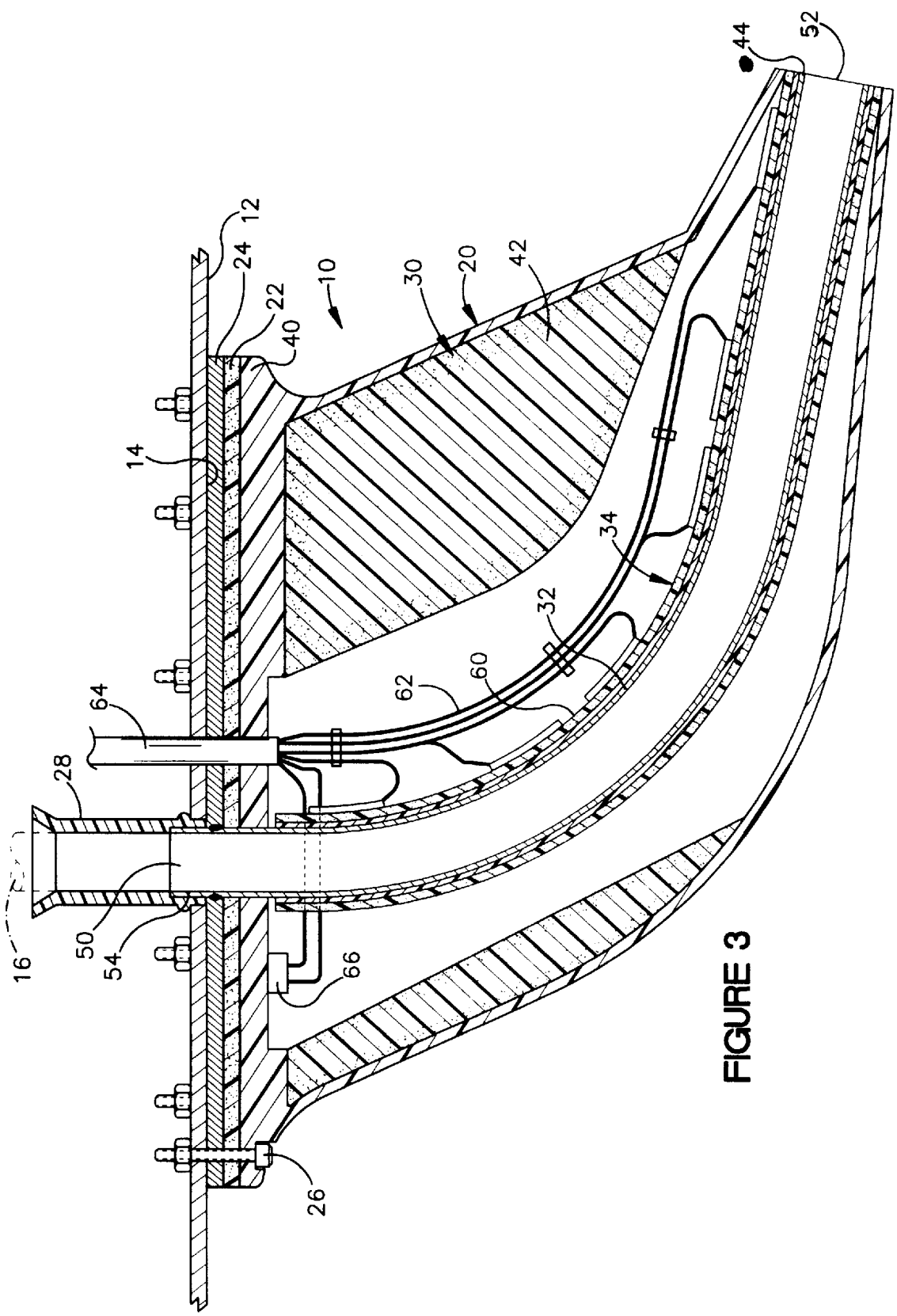
FIG. 3 is a cross-sectional view of the drainmast assembly.

Referring further to FIG. 3, the drainmast 20 comprises a fairing 30, a drain tube 32, and an electric heater 34. The illustrated fairing 30 is a one piece fairing that is formed by, for example, resin transfer molding and comprises a mounting flange 40, a mast 42 and an exit cap 44. The flange 40 defines a flat oval mounting surface and includes the drainmast mounting holes $20_{holes}$, a central opening 46 for the drain tube 32, and also a cable hole 48. For aerodynamic advantages, the mast 42 is swept and wing shaped and tapers from the mounting flange 40 into the exit cap 44. The fairing mounting flange 40, the mast 42, and the exit cap 44 define a foam-filled cavity in which the drain tube 32 is positioned.

The drain tube 32 is made of a metallic material, such as stainless steel, and has an inlet 50 and an outlet 52. The inlet 50 is coupled to the adapter 28 and the outlet 52 is positioned at the exit of the fairing cap 32. In the illustrated rear discharge drainmast 20, the axis of the drain tube 32 at its inlet 50 is perpendicular to the mounting surface of the fairing flange 40 and the axis of the drain tube 32 at its outlet 52 is parallel to the airflow direction. Accordingly, the drain tube 32 follows a curved path between its inlet 50 and its outlet 52. In any event, the drain tube 32 is substantially enclosed within the fairing 30 except that an upper inlet portion 54 adjacent its inlet 50 extends through the opening 46 and is positioned above the fairing mounting flange 32. Also, the outlet 52 of the drain tube 32 is exposed at the distal end of the fairing exit cap 44.

In the illustrated embodiment, the electric heater 34 comprises a sleeve 60 which is wrapped around and is bonded to the outside of the drain tube 32. The sleeve 60 comprises layers of electric insulating material, thermal insulating material, and radiant heat barrier material. Heater wire is encapsulated in the electric insulating material and electric current is supplied to the heater sleeve 60 through power wires 62 extending from a cable 64. A thermoswitch 66 may also be provided and positioned within the fairing hollow.

In the illustrated embodiment, the gasket 22 also has a flat and substantially oval-shape matching that of the fairing mounting flange 40. A central opening 70 is provided to accommodate the upper inlet portion 54 of the drain tube 32 and an opening 72 is provided to accommodate the cable 64 of the heater 34. The gasket 22 is made from a dielectric material, such as a dielectric elastomeric material, that will provide the desired compression of the grounding plate 24 against the aircraft mounting surface 14. The upper inlet portion 54 of the drain tube 32 extends through the gasket's central opening 70 but need not be attached thereto. In the installed drainmast assembly 10, the gasket 22 is positioned between fairing mounting flange 40 and the grounding plate 24.

In the illustrated embodiment, the grounding plate 24 has a flat and substantially oval-shape matching that of the fairing mounting flange 40. A central opening 74 is provided to accommodate the upper inlet portion 54 of the drain tube pipe and an opening 76 is provided to accommodate the cable 64 of the heater 34. The grounding plate 24 is made from an electrically conductive material and may be made of a metal such as stainless steel, copper or brass alloys. The upper inlet portion 54 of the drain tube 32 extends through the central opening 72 and the drain tube 32 is welded thereto. Accordingly, a conductive path is established between the metal grounding plate 24 and the metal drain tube 32. In the installed drainmast assembly 10, the grounding plate 24 is pressed against the mounting surface 14 of the aircraft 12.

If a lightning strike was to occur proximate the drainmast assembly 10, it is expected to attach to the fairing exit cap 44 and travel up the metallic drain tube 32 to the grounding plate 24. The grounding plate 24 is pressed against the aircraft mounting surface 14 by the gasket 22. When the drainmast assembly 10 is installed, sufficient pressure is developed between the fairing mounting flange 40 and the aircraft fuselage to ensure good metal-to-metal contact between the aircraft and the grounding plate 24. Accordingly, the drainmast assembly 10 of the present invention allows a simple lightning protection installation from outside the aircraft 14. It is not necessary to remove paint or apply any protective coatings to the surface of the fuselage, as any paint in the bonding region will most likely be burned away if a strike were to occur.

To prevent any leakage current from traveling further into the aircraft 12 from the drain tube 32, the adapter 28 may be made from an electrically non-conductive elastomer. In this manner, the lightning current will be prevented from traveling from the drain tube 32 to the aircraft waste water outlet pipe 16. Although not specifically shown in the drawings, the adapter 28 may be provided with a heating element to prevent waste water from freezing within the inlet portion 54 of the drain pipe.

Although the invention has been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the following claims.

What is claimed is:

1. A drainmast assembly comprising a drainmast for ejection of waste water from an aircraft and a grounding plate for protection against lightning strike currents;

the drainmast comprising a fairing and a drain tube;

the fairing being made of an electrically non-conductive material and including a mounting flange, an exit cap, and an aerodynamically advantageously shaped mast extending from the mounting flange to the exit cap;

the drain tube being made of an electrically conductive material, positioned at least partially within the fairing, and including an inlet which communicates with an aircraft waste water system and an outlet positioned within the fairing's exit cap;

the grounding plate being made of an electrically conductive material and being attached to the drain tube in such manner that a conductive path is established between the grounding plate and the drain tube;

the grounding plate being positioned relative to the fairing's mounting flange so that it may be placed in contact with the aircraft fuselage during installation of the drainmast whereby an electrically conductive path is formed thereby allowing lightning strike currents to travel from the drain tube to the grounding plate to the aircraft fuselage.

2. A drainmast assembly as set forth in claim 1, wherein the mounting flange defines an outer mounting surface of the fairing, and wherein the area of the grounding plate in contact with the aircraft fuselage is substantially the same or greater than the area of the mounting surface of the fairing.

3. A drainmast assembly as set forth in claim 1, wherein the drain tube is welded to the grounding plate.

4. A drainmast assembly as set forth in claim 1, wherein the drain tube includes an inlet portion projecting outward from the fairing's mounting flange and wherein the grounding plate is attached to the inlet portion of the drain tube.

5. A drainmast assembly as set forth in claim 4, wherein the grounding plate includes a central opening, wherein the inlet portion of the drain tube extends through this central opening, and wherein the drain tube is welded to edges of the grounding plate defining this central opening.

6. A drainmast assembly as set forth in claim 1, further comprising a mounting gasket made of an electrically non-conductive material and positioned between the fairing's mounting flange and the grounding plate and wherein the mounting gasket includes a central opening and the inlet portion of the drain tube extends through this central opening.

7. A drainmast assembly as set forth in claim 1, further comprising a mounting gasket made of an electrically non-conductive material and positioned between the flange of the fairing and the grounding plate.

8. A drainmast assembly as set forth in claim 7, wherein the gasket is made of an elastomeric material.

9. A method of installing the drainmast assembly of claim 6 on an aircraft, said method comprising the steps of:
   positioning the mounting gasket between the mounting flange of the fairing and the grounding plate; and
   inserting fasteners through aligned openings in the mounting flange, the mounting gasket, and the grounding plate.

10. A drainmast assembly as set forth in claim 6, further comprising fasteners which extend through aligned openings in the drainmast, the grounding plate, and the mounting gasket to attach the drainmast to a mounting surface of the aircraft and to establish electrically conductive contact between the grounding plate and the mounting surface of the aircraft.

11. A drainmast assembly as set forth in claim 6, wherein the fairing is made of an electrically non-conductive composite material, the drain tube is made of metal material, the grounding plate is made of a metal material, and the mounting gasket is made of an elastomeric material.

12. A drainmast assembly as set forth in claim 1, further comprising an adapter which couples the inlet of the drain tube to an outlet of an aircraft waste water system pipe and wherein the adapter is made of an electrically non-conductive material whereby the lightning current will be prevented from sparking from the drain tube to the aircraft waste water pipe.

13. A drainmast assembly as set forth in claim 1, wherein the drainmast further comprises a heater for preventing liquid within the drain tube from freezing.

14. In combination, an aircraft and the drainmast assembly of claim 1 installed on the aircraft in such a manner that the grounding plate is in electrical contact with the fuselage of the aircraft.

15. A method of protecting an aircraft against lightning strike currents, said method comprising the steps of installing the drainmast assembly of claim 1 on an aircraft in such a manner that the grounding plate is in electrical contact with the fuselage of the aircraft.

16. A method as set forth in claim 15, wherein said installing step is performed without removing paint from the mounting surface of the fuselage and without applying any protective coating to the mounting surface of the fuselage.

17. A drainmast assembly comprising:
   a fairing made of dielectric material and including a mounting flange defining a mounting surface, an exit cap, and an aerodynamically advantageously shaped mast extending from the mounting surface to the exit cap;
   a drain tube which is made of electrically conductive material, which is positioned at least partially within the fairing, and which includes an inlet which communicates with the aircraft waste water system and an outlet positioned within the exit cap;
   characterized by:
   a grounding plate which is made of an electrically conductive material, which is attached to the drain tube in such manner that a conductive path is established between the grounding plate and the drain tube, and which is positioned relative to the fairing's mounting flange so that it may be placed in contact with the aircraft fuselage during installation of the drainmast whereby an electrically conductive path is formed thereby allowing lightning strike currents to travel from the drain tube to the grounding plate to the aircraft fuselage.

* * * * *